United States Patent
Zhang et al.

(10) Patent No.: US 9,722,927 B2
(45) Date of Patent: Aug. 1, 2017

(54) SERVICE CHAIN TOPOLOGY MAP CONSTRUCTION

(71) Applicant: Futurewei Technologies, Inc., Plano, TX (US)

(72) Inventors: Hong Zhang, Palo Alto, CA (US); Linda Dunbar, Plano, TX (US); Young Lee, Plano, TX (US)

(73) Assignee: Futurewei Technologies, Inc., Plano, TX (US)

(*) Notice: Subject to any disclaimer, the term of this patent is extended or adjusted under 35 U.S.C. 154(b) by 108 days.

(21) Appl. No.: 14/732,268

(22) Filed: Jun. 5, 2015

(65) Prior Publication Data

US 2015/0358235 A1 Dec. 10, 2015

Related U.S. Application Data

(60) Provisional application No. 62/008,278, filed on Jun. 5, 2014.

(51) Int. Cl.
*H04L 12/801* (2013.01)
*H04L 12/741* (2013.01)

(52) U.S. Cl.
CPC .......... *H04L 47/12* (2013.01); *H04L 45/745* (2013.01)

(58) Field of Classification Search
None
See application file for complete search history.

(56) References Cited

U.S. PATENT DOCUMENTS

2016/0006654 A1* 1/2016 Fernando ............... H04L 45/74
370/392

OTHER PUBLICATIONS

Dunbar, L., et al., "Framework for Service Function Path Control," draft-dunbar-sfc-path-control-01.txt, SFC Working Group, Standard Track, Mar. 6, 2015, 17 pgs.
Parker, R., "Service Function Chaining: Chain to Path Reduction," draft-parker-sfc-chain-to-path-00, SFC, Nov. 8, 2013, 11 pgs.
Li, H., et al., "Service Function Chaining (SFC) Control Plane Components & Requirements," draft-ww-sfc-control-plane-05, Service Function Chaining (SFC), Jun. 2, 2015, 27 pgs.
Dunbar, L., et al., "Framework for Interface to Network Security Functions," draft-merged-i2nsf-framework-01.txt, Network Working Group, Jun. 3, 2015, 15 pgs.

(Continued)

*Primary Examiner* — Rhonda Murphy
(74) *Attorney, Agent, or Firm* — Conley Rose, P.C.

(57) ABSTRACT

A method implemented by a network controller, comprising receiving an address filter from a service chain orchestrator, wherein the address filter comprises a plurality of service instance (SI) addresses associated with a plurality of SIs in a network, obtaining network topology information from a plurality of service function (SF) forwarders controlled by the network controller, wherein the network topology information indicates a plurality of network devices communicatively coupled to the plurality of controlled SF forwarders, and wherein at least some of the network devices are SI hosting devices, and generating a service chain topology map by building mappings between at least some of the plurality of controlled SF forwarders, the SI hosting devices, and the plurality of SIs according to the network topology information and the address filter.

12 Claims, 10 Drawing Sheets

(56) References Cited

OTHER PUBLICATIONS

Wu, Q., et al., "Service Function Chain Control Plane Overview," draft-ww-sfc-control-plane-00, Network Working Group, Standards Track, Feb. 14, 2014, 14 pgs.
"L4-L7 Service Function Chaining Solution Architecture," Open Network Foundation, Version 1.0, Apr. 28, 2015, 36 pgs.

\* cited by examiner

SERVICE CHAIN TOPOLOGY MAP CONSTRUCTION

CROSS-REFERENCE TO RELATED APPLICATIONS

The present application claims priority to U.S. Provisional Patent Application 62/008,278, filed Jun. 5, 2014 by Hong Zhang, et. al., and entitled "Service Chain Topology Map Construction Mechanism", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Service chaining refers to a service deployment model that applies a sequence of network services to a data flow in a specific order. A service chaining deployment model may insert Open Systems Interconnection (OSI) Layer 4 (L4) to Layer 7 (L7) services in data-forwarding paths between peers. Some examples of L4 to L7 services may include firewalls (FWs), wide area network (WAN) and application accelerations, load balancing (LB), and network address translations (NATs). The L4 to L7 services are commonly provided by dedicated hardware appliances located at a centralized location, for example, at a data center (DC) gateway. Thus, data-forwarding may direct all traffic to traverse through the DC gateway, which may cause a high volume of traffic at the DC gateway.

SUMMARY

In one embodiment, the disclosure includes a method implemented by a network controller, comprising receiving an address filter from a service chain orchestrator, wherein the address filter comprises a plurality of service instance (SI) addresses associated with a plurality of SIs in a network, obtaining network topology information from a plurality of service function (SF) forwarders controlled by the network controller, wherein the network topology information indicates a plurality of network devices communicatively coupled to the plurality of controlled SF forwarders, and wherein at least some of the network devices are SI hosting devices, and generating a service chain topology map by building mappings between at least some of the plurality of controlled SF forwarders, the SI hosting devices, and the plurality of SIs according to the network topology information and the address filter.

In another embodiment, the disclosure includes a software-defined networking (SDN) controller comprising a receiver configured to receive an address filter from a service chain orchestrator, wherein the address filter comprises a plurality of SI addresses associated with a plurality of SIs in a network, and a processor coupled to the receiver and configured to obtain network topology information identifying a plurality of SF forwarders controlled by the SDN controller, wherein the network topology information indicates a plurality of network devices that are communicatively coupled to the plurality of controlled SF forwarders, and wherein at least some of the plurality of communicatively coupled network devices are SI hosting devices, and generate a service chain topology map by building mappings between the plurality of controlled SF forwarders, the SI hosting devices, and the plurality of SIs according to the network topology information and the address filter.

In yet another embodiment, the disclosure includes a service chain orchestrator comprising a receiver configured to receive SI information from a SI management entity, wherein the SI information identifies a plurality of SIs and addresses of a plurality of SI hosting devices that host the plurality of SIs, a processor coupled to the receiver and configured to construct an address filter comprising the plurality of SI hosting device addresses, and a transmitter coupled to the processor and configured to send the address filter to a SDN controller.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
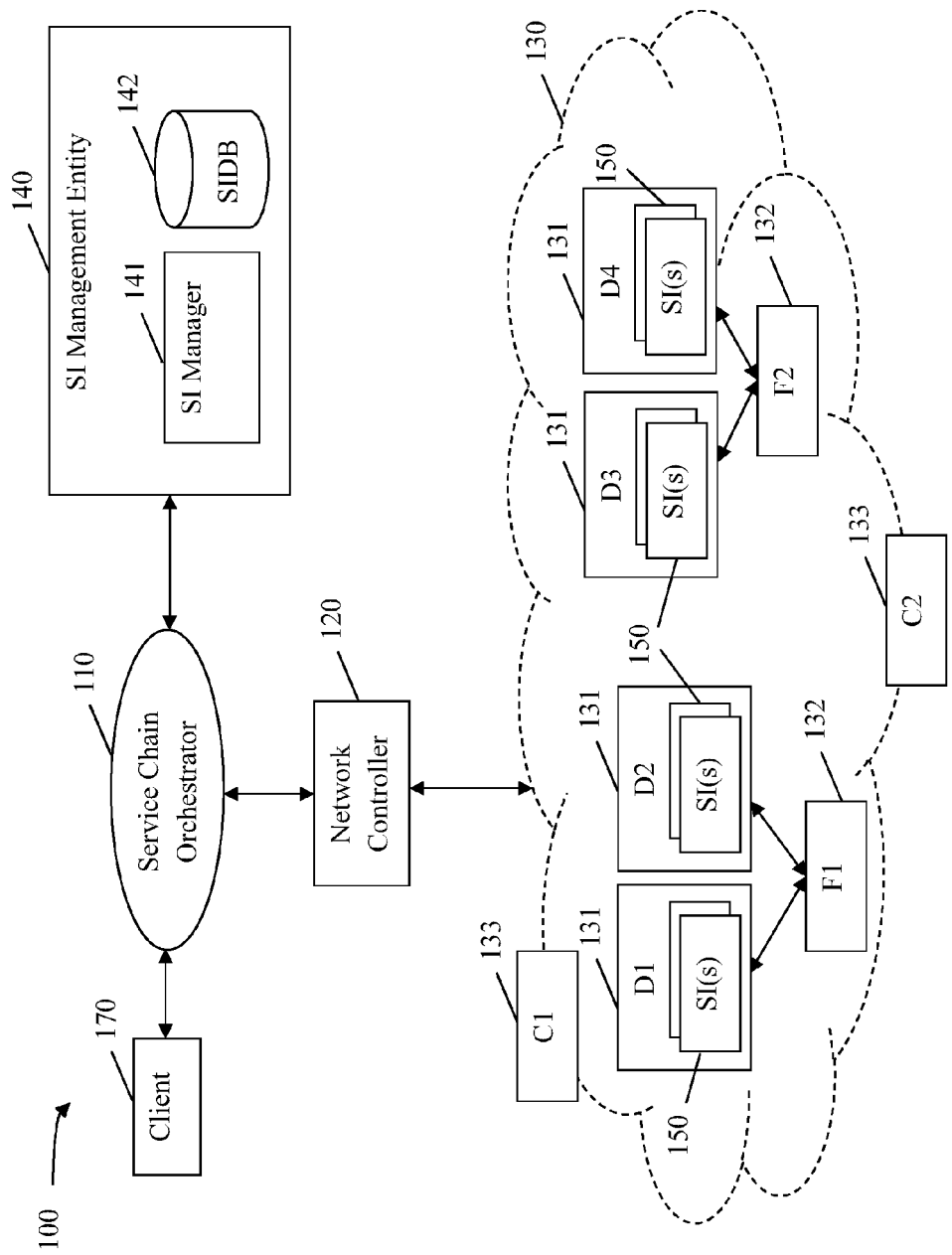
FIG. 1 is a schematic diagram of an embodiment of a service chain network system.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

A service chaining deployment model may leverage recent development of network functions virtualization (NFV) and SDN technologies. NFV enables the migration of services from dedicated hardware to software and/or virtual machines (VMs). SDN enables the separation of control and forwarding functions and a software programmable control plane. For example, services may be implemented as software components, moved out of the centralized location, and instantiated at multiple locations in the network by employing NFV. Data flows may be steered through the service instance locations by employing the SDN model, where a network controller may configure network nodes with data-forwarding instructions. Some example service chain deployment models are described in Internet Engineering Task Force (IETF) documents draft-ww-sfc-control-plane-04.txt and draft-dunbar-sfc-path-control-01.txt and Open Networking Foundation (ONF) L4-L7 service function chaining solution architecture documents, which are incorporated herein by reference.

A service chain defines an ordered set of abstract service functions that may be applied to packets and/or data frames. Some examples of service functions or network services may include FWs, NATs, LBs, Transmission Control Protocol (TCP) accelerations, and other L4 to L7 network services. A service chain path is an instantiation of a service chain. A service chain path traverses through a sequence of service instances (SIs) in a network, where the SIs are instances of the network services in the service chain and the SIs are ordered according to the ordering constraints of the service chain. A service chain path may also be referred to as a service function path or a service path. SIs may also be referred to as service function instances or Service Function Instance Components (SFICs). SIs may be hosted by physical appliances and/or VMs, which may be referred to as SI hosting devices. SI hosting devices may be distributed throughout a network. In addition, a particular type of SIs (e.g., FW) may be instantiated at multiple locations in a network. For example, a VM located at one location of the network may host two FW SIs (e.g., FW-instance 1 and FW-instance 2) and two TCP acceleration SIs (e.g., TCP-instance 1 and TCP-instance 2). A physical appliance located at another location may host a LB SI (e.g., LB-instance 1), two NAT SIs (e.g., NAT-instance 1 and NAT-instance 2), and another FW instance (e.g., FW-instance 3).

As an example, a first service chain, denoted as SC1, may be composed from an ordered set of SIs, denoted as {s1, s4, s6}, and a second service chain, denoted as SC2, may be composed from another ordered set of SIs, denoted as {s4, s7}, where s1 may be an FW SI, s4 may be a NAT SI, s6 may be an LB SI, and s7 may be a TCP acceleration SI. Thus, in order to serve the first service chain, SC1, a first service chain path is selected to traverse through an FW SI, followed by a NAT SI and an LB SI. Similarly, in order to service the second service chain, SC2, a second service chain path is selected to traverse through a NAT SI, followed by a TCP acceleration SI. SIs are hosted on SI hosting devices (e.g., physical appliances or virtual machines), thus traffic is steered through the SI hosting devices. However, SI hosting devices are end systems, which may be non-data-forwarding devices. Thus, SI hosting devices are attached to data-forwarding nodes so that data traffic may be directed to and from the SI hosting devices. The data-forwarding nodes that are attached to the SI hosting devices are referred as service function (SF) forwarders. Therefore, the computation or establishment of service chain paths requires knowledge of the SI hosting devices and the SF forwarders that may reach (e.g., forward data to and from) the hosting devices. In addition, in an NFV environment, there may be a very large number of SIs for each SI type and a high chance of state or attachment change for SIs due to VMs being deleted, moved, or new VMs being instantiated. Thus, the locations of the SIs and/or attached SF forwarders may change dynamically. In order to automatically set up the service chain path and steer a data flow through a specific sequence of network services, a service chain topology map needs to be automatically constructed. Service chain topology map refers to the topology map of service appliances and/or service hosting VMs, as well as software and/or hardware switches that are connected to the service appliances and/or the service hosting VMs.

Disclosed herein are various embodiments for building service chains and service chain topology maps dynamically, based on service requests. SIs may be instantiated at any location in a network and may be relocated, added, and/or deleted as resource constraint changes. The disclosed embodiments provide mechanisms for locating SIs and corresponding SI hosting devices and attached SF forwarders so that service chain paths may be determined for steering traffic flows through SIs as required by the traffic flows. A service chain-enabled network comprises a service chain orchestrator, a SI management entity, a network controller, a plurality of SF forwarders, and a plurality of SI hosting devices hosting a plurality of SIs. The SF forwarders are communicatively coupled (e.g., attached) to the SI hosting devices and SIs. The SI hosting devices may host various types of SIs, such as FW, NAT, LB, and TCP acceleration services. The service chain orchestrator translates a client's abstract policy based service function requirements for a traffic flow into a SFC representation comprising SI locator information. For example, a client may request a sequence of network services. The service chain orchestrator locates instances of the network services in the network by consulting with the SI management entity. The SI management entity provides a list of SIs of the network services available in the network and corresponding SI information. For each SI, the SI information may include a device identifier (ID) and an address of a corresponding SI hosting device and one or more SI attributes (e.g., policies) associated with the SI. After obtaining SI availability in the network, the service chain orchestrator requests the network controller to locate SF forwarders that are attached to the SI hosting devices by providing an address filter comprising the SI hosting device addresses to the network controller. In addition, the service chain orchestrator sends the service request to the network controller to enable the network controller to select a service chain path (e.g., a forwarding path) for the client. The network controller builds mappings between the SF forwarders and the SI hosting device addresses. In one embodiment, the network controller distributes the address filter to the SF forwarders and the SF forwarders only reports the SI interfaces (IFs) to the network controller when the SI IFs meet address filtering rules. In another embodiment, the network controller collects mappings between all SF forwarders and all their connecting devices and filters out the mappings that are not associated with the SI hosting device addresses indicated in the address filter. Subsequently, the network controller constructs a service chain topology map that maps SIs to SF forwarders according to the SI information and the SI hosting device address-to-SF forwarder mappings. After constructing the service chain topology map, the network controller generates a service chain path for the client by selecting SIs and corresponding SF forwarders according to the sequence of network services received from the service request. In order to facilitate traffic steering along the service chain path, the network controller generates traffic steering rules and pushes the traffic steering rules to the SF forwarders along the service chain path. It should be noted that the service chain orchestrator and the network controller may be located on the same VM or same physical device, or on different VMs or different physical devices. The disclosed embodiments enable automatic service chain path constructions via dynamic SI and SI attachment detections.

FIG. 1 is an embodiment of a service chain network system 100. The system 100 comprises a service chain orchestrator 110, a network controller 120, a SI management entity 140, and a network 130. The network 130 is a service overlay network. The underlying physical network of the network 130 may comprise an electrical network, an optical network, and/or any types of physical network suitable for transporting data. The network 130 may comprise one or more network domains. The network 130 may employ any transport protocols, such as an Internet Protocol (IP)/User Datagram Protocol (UDP), suitable for transporting data over the underlying physical network. The network 130 may employ any type of network virtualization and/or network overlay technologies, such as a virtual extensible local area network (VXLAN). In an embodiment, the network 130 is a SDN-enabled network, where network control is decoupled from data-forwarding and the data plane is programmable by a control plane entity, such as the network controller 120, as discussed more fully below. The network 130 comprises a plurality of SI hosting devices 131 (e.g., D1, D2, D3, and D4), a plurality of SF forwarders 132 (e.g., F1 and F2), and a plurality of classifiers 133 (e.g., C1 and C2). The network 130 may further comprise other network nodes that are unaware of service chains and may not provide network services.

The SI hosting devices 131 may be physical hardware appliances, servers, VMs, or any other network devices configured to host and/or provide one or more SIs 150. The SI hosting devices 131 may be located at various locations throughout the network 130. The SIs 150 may be any type of network services, such as FW, NAT, and LB. For example, a first plurality of the SIs 150 may be FW SIs, a second plurality of the SIs 150 may be NAT SIs, and a third plurality of the SIs 150 may be LB SIs. Some SIs 150 of the same type may support the same capabilities and/or policies, while other SIs 150 of the same type may support different capabilities and/or policies. For example, one NAT SI 150 supports a policy A and a data throughput of about 10 gigabit per second (Gbps) and another NAT SI 150 supports a policy B and a data throughput of about 100 Gbps. In some embodiments, the SIs 150 and/or the SI hosting devices 131 are provided by different vendors. For example, one vendor provides SIs 150 at one area of the network 130 and another vendor provides SIs 150 at another area of the network 130. The SI hosting devices 131 are identified by addresses (e.g., IP addresses and/or media access control (MAC) addresses) and/or device IDs irrespective of whether the SI hosting devices 131 are physical appliances or VMs. In some embodiments, a vendor may configure all its SI hosting devices 131 in a same subnet, thus all SI hosting devices 131 of a particular vendor may comprise IP addresses of 10.1.1.X.

The SF forwarders 132 may be routers, switches, or any other network devices configured to forward data to one or more SIs 150. A SF forwarder 132 may be a VM or a physical device coupled to one or more SI hosting devices 131 and logically attached to the SIs 150 hosted by the SI hosting devices 131. In some embodiments, the SF forwarders 132 may be OpenFlow (OF) switches. As shown, the SF forwarder F1 132 is coupled to the SI hosting devices D1 and D2 131 and logically attached to the SIs 150 hosted by the SI hosting devices D1 and D2 131. The SF forwarder F2 132 is coupled to the SI hosting device D3 and D4 131 and logically attached to the SIs 150 hosted by the SI hosting devices D3 and D4 131. The SF forwarders 132 may receive requests from the network controller 120 to report SI hosting devices 131 that are coupled to the SF forwarders 132 to support service chain topology map and service chain path construction. In some embodiments, the SF forwarders may discover the SI hosting devices 131 by employing an address resolution protocol (ARP) for IP version 4 (IPv4) addresses and/or a neighbor discovery protocol (NDP) for IP version 6 (IPv6) addresses. The SF forwarders 132 may receive forwarding instructions and/or traffic steering policies from the network controller 120 to facilitate traffic steering. For example, a SF forwarder 132 may be instructed to steer traffic through one or more SIs 150 located at one or more SI hosting devices 132. In some embodiments, the SF forwarders 132 may also steer traffic according to service chain information attached to the data packets, for example, by the classifier 133, as discussed more fully below. It should be noted that some SF forwarders 132 may comprise VMs acting as SI hosting devices 131 hosting SIs, where the SF forwarders 132 may route traffic to the SI hosting devices 131 according the SI hosting device 131 addresses via hypervisors executed on the SF forwarders 132.

The classifiers 133 may be routers, switches, or any other network devices configured to perform service chain classification. The classifiers 133 may be VMs, physical devices, or combinations thereof. In some embodiments, the classifiers 133 may be OF switches. The classifiers 133 may be located at a boundary or an edge of a service chain domain (e.g., the network 130). The classifiers 133 may act as ingress nodes in the network 130. The classifiers 133 may receive classification rules from the network controller 120, as discussed more fully below. The classifiers 133 classify incoming data from source endpoints (e.g., client data generating nodes), which may be external to the service chain domain, according to the received classification rules. The incoming data may require certain services (e.g., FW, NAT, or LB) in the network 130. In some embodiments, the classifiers 133 may attach at least some service chain information to the incoming data according to the received classification rules in order to facilitate the steering of the data through the required services, for example, via the SF forwarders 132 and the SI hosting devices 131.

The SI management entity 140 comprises a SI manager 141 and a SI database (SIDB) 142. The SIDB 142 is a collection of information associated with the SIs 150 hosted in the network 130. For a particular SI 150 hosted on a SI hosting device 131, the SIDB 142 may store a SI type (e.g., FW or NAT), a SI state (e.g., up), SI attributes of the SI 150, and a device ID (e.g., VM1) and an address of the SI hosting device 131. The SI attributes may include matching conditions (e.g., packet content-based or contextual-based), actions, and/or policies (e.g., vendor-specific), as discussed more fully below. The SI manager 141 is a software component configured to manage the SIDB 142 and communicates with the service chain orchestrator 110. For example, upon receiving a SI query from the service chain orchestrator 110, the SI manager 141 retrieves SI information from the SIDB 142 and provides the SI information to the service chain orchestrator 110. It should be noted that in some embodiments, the SI manager 141 and the SIDB 142 may be vendor-specific, where the SI manager 141 may manage and track only the SIs 150 and/or SI hosting devices 131 provided by a particular vendor. In such embodiments, the system 100 may comprise multiple vendor-specific SI management entities.

The service chain orchestrator 110 may be one or more VMs, a system, a distributed system, or any other device and/or system comprising a plurality of computing devices configured to create and manage service chains and/or service overlay topologies. The service chain orchestrator 110 acts as a service chain administrative entity over a service chain domain operating in the network 130. The service chain orchestrator 110 provides an interface for a client 170 to specify service chain requirements and coordinates with the network controller 120 and the SI manager 141 to set up service chain paths for forwarding the client's 170 traffic in the network 130. For example, a client 170 may send a service chain request indicating a sequence of network services for a data flow. Upon receiving the service chain request, the service chain orchestrator 110 queries the SI management entity 140 for availability of the network services in the network 130 and forwards SI information of the network services and the client's 170 service chain request to the network controller 120. For example, the service chain orchestrator 110 may obtain a list of available SIs 150 of the network services in the network 130 and corresponding SI information. The SI information may include SI types, SI states, SI attributes, SI hosting device IDs, and SI hosting device addresses for the SIs 150. After obtaining the list of available SIs 150, the service chain orchestrator 110 may send an address filter comprising the SI hosting device addresses to the network controller 120 and requests the network controller 120 to build mappings between the SI hosting device addresses and the SF forwarders 132. In an embodiment, the service chain orchestrator 110 may be an Open Stack-based service chain orchestrator comprising a service chain manager and a SI catalog manager, where the service chain manager interfaces with the client 170 and the SI catalog manager interfaces with the SI management entity 140

The network controller 120 may be one or more VMs, a system, a distributed system, or any other device and/or system comprising a plurality of computing devices configured to manage the network 130, constructs service chain topology map, and setup service chain path. The network controller 120 has a global network topology view of the network 130. The network topology information includes connection information between the SF forwarders 132 and all network devices (e.g., NEs) connected to the SF forwarders 132. For example, some of the connected devices may be SI hosting devices 131, while some other connecting devices may not be SI hosting devices 131. During service chain topology map construction, the network controller 120 may receive an address filter comprising a list of SI hosting device 131 addresses from the service chain orchestrator 110. In one embodiment, the network controller 120 distributes the address filter to the SF forwarders 132 and the SF forwarders only report the SI IFs that meet the filter rule. In another embodiment, the network controller 120 collects mappings between all SF forwarders 132 and directly connecting devices. The network controller 120 filters out the mappings that are not associated with the SI hosting device addresses included in the address filter. Based on the SI information and the SI hosting device-address-to-SF forwarder mappings, the network controller 120 constructs a service chain topology map by mapping the available SIs 150 to the SF forwarders 132.

To select a service chain path, the network controller 120 may employ a path computation element (PCE) to compute a shortest path through the network 130 traversing a subset of the available SIs 150 corresponding to the requested network services via SF forwarders 132 associated with or logically attached to the SIs 150 and conforming to the network service order specified in the requested sequence. Based on the selected service chain path, the network controller 120 determines traffic steering rules (e.g., forwarding rules and/or classification rules) for the service chain path and pushes the traffic steering rules to the SF forwarders 132 and/or the classifier 133 along the service chain path. In some embodiments, the network 130 may be managed by multiple network controllers 120 operating in parallel. For example, each vendor may employ a network controller 120 to manage a group of SI hosting devices 131 and/or a group of SF forwarders 132 owned by the vendor. In some other embodiments, the network controller 120 may be located on the same server as the service chain orchestrator 110. It should be noted that the system 100 may be configured as shown or alternatively configured as determined by a person of ordinary skill in the art to achieve the same functionalities.

Figure 2:
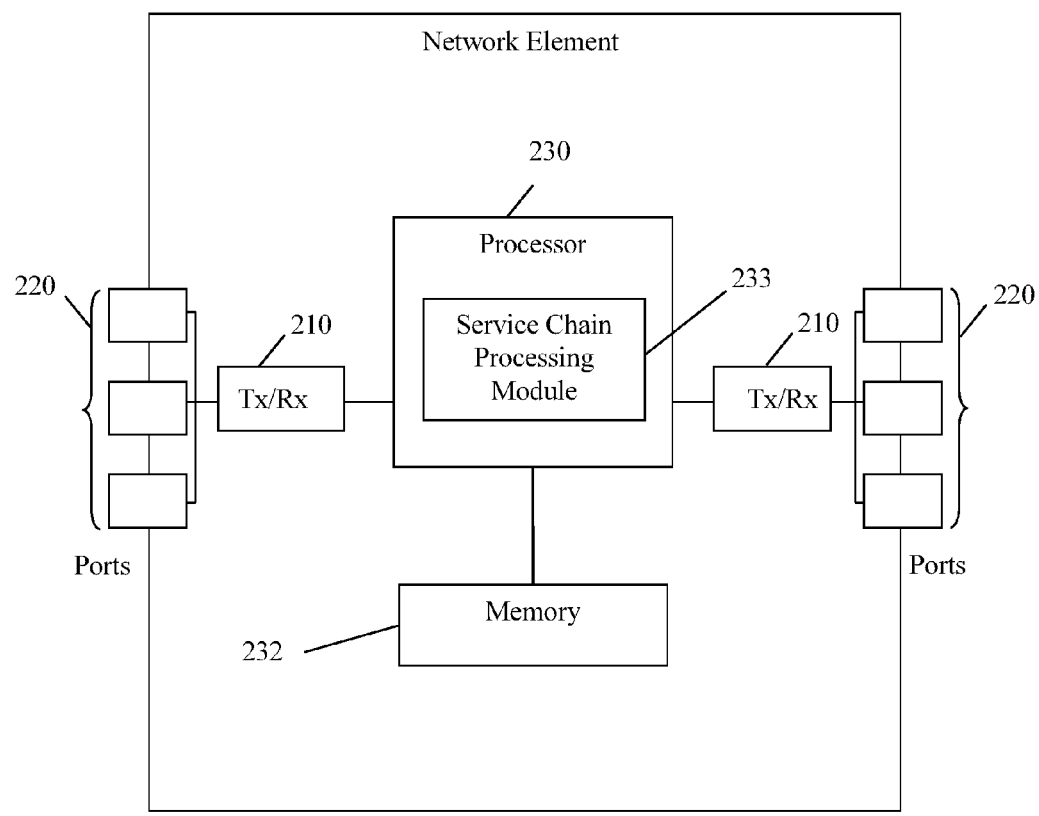
FIG. 2 is a schematic diagram of an embodiment of a network element (NE) acting as a node in a network.

FIG. 2 is a schematic diagram of an example embodiment of an NE 200 acting as a node, such as a SI management entity 140, a service chain orchestrator 110, a network controller 120, a SI hosting device 131, a SF forwarder 132, and/or a classifier 133, in a network, such as the system 100. NE 200 may be configured to implement and/or support the service chain and/or service chain topology map construction mechanisms described herein. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments. At least some of the features and/or methods described in the disclosure may be implemented in a network apparatus or module such as an NE 200. For instance, the features and/or methods in the disclosure may be implemented using hardware, firmware, and/or software installed to run on hardware. As shown in FIG. 2, the NE 200 may comprise transceivers (Tx/Rx) 210, which may be transmitters, receivers, or combinations thereof. A Tx/Rx 210 may be coupled to plurality of ports 220 for transmitting and/or receiving frames from other nodes. A processor 230 may be coupled to the Tx/Rx 210 to process the frames and/or determine which nodes to send the frames to. The processor 230 may comprise one or more multi-core processors and/or memory devices 232, which may function as data stores, buffers, etc. The processor 230 may be implemented as a general processor or may be part of one or more application specific integrated circuits (ASICs) and/or digital signal processors (DSPs). The processor 230 may comprise a service chain processing module 233, which may perform processing functions of a SI management entity, a service chain orchestrator, a network controller, or a SF forwarder and implement methods 300, 400, 500, and 600, as discussed more fully below, and/or any other method discussed herein. As such, the inclusion of the service chain processing module 233 and associated methods and systems provide improvements to the functionality of the NE 200. Further, the service chain processing module 233 effects a transformation of a particular article (e.g., the network) to a different state. In an alternative embodiment, the service chain processing module 233 may be implemented as instructions stored in the memory devices 232, which may be executed by the processor 230. The memory device 232 may comprise a cache for temporarily storing content, e.g., a random-access memory (RAM). Additionally, the memory device 232 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 232 may be configured to store SI information, such as the SIDB 142, service chain topology maps, and/or traffic steering policies.

It is understood that by programming and/or loading executable instructions onto the NE 200, at least one of the processor 230 and/or memory device 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
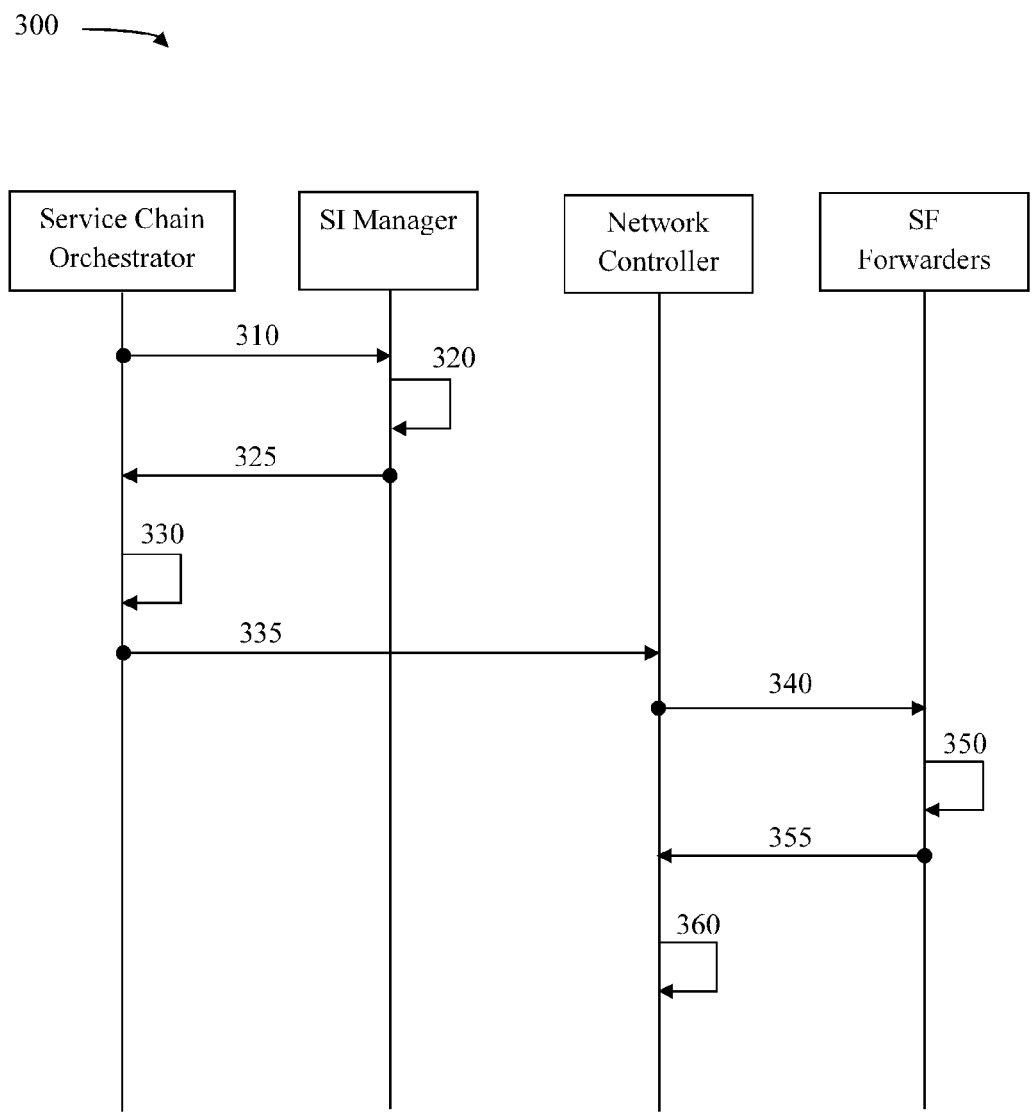
FIG. 3 is a protocol diagram of an embodiment of a service chain topology map generation method.

FIG. 3 is a protocol diagram of an embodiment of a service chain topology map generation method 300. The method 300 is implemented between a service chain orchestrator, such as the service chain orchestrator 110, a SI manager, such as the SI manager 141, a network controller, such as the network controller 120, one or more SF forwarders, such as the SF forwarders 132. The method 300 is implemented when the service chain orchestrator receives a service request for a service chain comprising a sequence of network services required by a data flow. At step 310, the service chain orchestrator sends a request to the SI manager to locate SIs (e.g., SIs 150) of the requested network services in a network (e.g., network 130). At step 320, the SI manager retrieves SI information corresponding to the requested network services, for example, from a SIDB, such as the SIDB 142. The SI information may include a SI type (e.g., FW, NAT, LB, TCP acceleration), a SI activity state (e.g., up), a SI attribute for each SI, and a device ID and an address (e.g., an IP address and/or a MAC address) of a corresponding SI hosting device (e.g., SI hosting device 131). Some examples of SI attributes may include matching conditions, actions, and/or profiles. Matching conditions may be based on packet contents at various packet header levels (e.g., IP, MAC, TCP, and/or UDP). Matching conditions may also be based on contexts (e.g., time, events, and/or port states). Actions may include dropping packets, passing packets, or re-directing packets. Profiles may be based on some functional criteria or policies. For example, a profile for a web filtering service may specify a black list, which may comprise a list of IP addresses that are to be blocked or filtered out. At step 325, the SI manager sends the retrieved SI information to the service chain orchestrator. It should be noted that the SI hosting devices may be physical hardware appliances (e.g., dedicated hardware) and/or VMs. Some network services may be instantiated at multiple SI hosting devices distributed throughout the network. The SI hosting devices may be provided by one or more vendors. In some embodiments, each vendor may employ a separate SI management entity to manage the vendor's SI hosting devices and SIs. In such embodiments, the service chain orchestrator may send a request to each vendor-specific SI management entity to request for availability of the network services in the network.

At step 330, upon receiving the SI information, the service chain orchestrator constructs an address filter from the SI hosting device addresses indicated in the SI information. At step 335, the service chain orchestrator sends the address filter, the SI information, and the service request to the network controller. In some embodiments, a network may be managed by multiple network controllers. For example, each network controller may manage a portion of SF forwarders in the network. In such embodiments, the service chain orchestrator may send the address filter to each of the network controllers.

At step 340, the network controller distributes the address filter to the SF forwarders and requests the SF forwarders to respond when the SF forwarders are coupled to the SI hosting devices identified by the SI hosting device addresses included in the address filter. At step 350, upon receiving the address filter, each SF forwarder determines whether the SI hosting devices identified by the SI hosting device addresses indicated in the address filter are reachable. At step 355, when the SF forwarder is coupled to one or more of the SI hosting devices, the SF forwarder sends a response to the network controller. For example, the response may comprise the SF forwarder address and the SI hosting device addresses. At step 360, after receiving the responses from the SF forwarders, the network controller generates a service chain topology map by building mappings between the SF forwarders and the SI hosting device addresses according to the received responses. It should be noted that the method 300 may be performed according to the steps as shown or alternatively configured as determined by a person of ordinary skill in the art to achieve similar functionalities.

Figure 4:
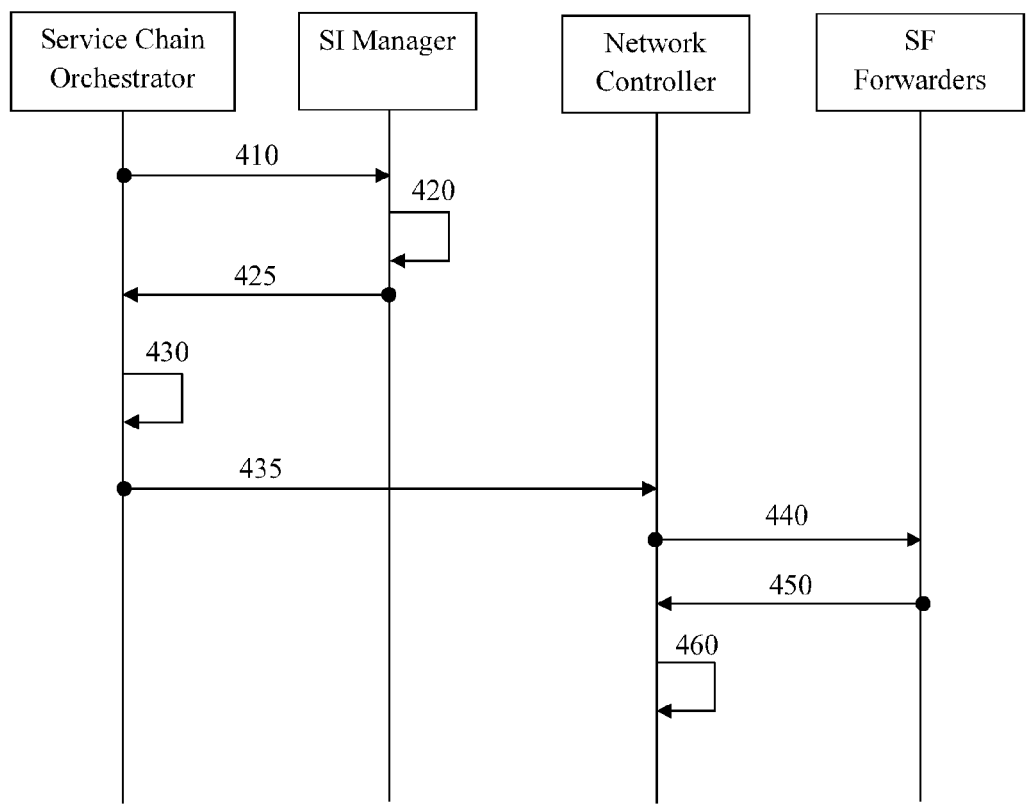
FIG. 4 is a protocol diagram of another embodiment of a service chain topology map generation method.

FIG. 4 is a protocol diagram of another embodiment of a service chain topology map generation method 400. The method 400 is implemented between a service chain orchestrator, such as the service chain orchestrator 110, a SI manager, such as the SI manager 141, a network controller, such as the network controller 120, one or more SF forwarders, such as the SF forwarders 132. The method 400 is similar to the method 300, but the SI hosting device address filtering is performed at the network controller instead of at the SF forwarders. The method 400 is implemented when the service chain orchestrator receives a service request for a service chain comprising a sequence of network services required by a data flow. At step 410, the service chain orchestrator sends a request to the SI manager to locate SIs (e.g., SIs 150) of the requested network services in a network (e.g., network 130). At step 420, the SI manager retrieves SI information corresponding to the requested network services, for example, from a SIDB, such as the SIDB 142. For each SI, the SI information may include a SI type, a SI state, SI attributes, and a device ID and an address (e.g., an IP address and/or a MAC address) of a corresponding SI hosting device (e.g., SI hosting device 131). At step 425, the SI manager sends the retrieved SI information to the service chain orchestrator. At step 430, the service chain orchestrator constructs an address filter from the SI hosting device addresses indicated in the SI information. At step 435, the service chain orchestrator sends the address filter, the service request, and the SI information to the network controller.

At step 440, the network controller broadcasts a request to all the SF forwarders in the network to report attached devices. At step 450, each SF forwarder sends a response to the network controller indicating all devices that are attached to the SF forwarder. For example, each response may include a SF forwarder address and a list of device addresses. At step 460, after receiving the reports from all the SF forwarders, the network controller performs address filtering by filtering out the device addresses from the SF forwarders' responses that are not matched to the SI hosting device addresses indicated in the address filter. After performing the address filtering, the network controller generates a service chain topology map by building a SI hosting device-address-to-SF forwarder map according to the filtered responses. It should be noted that the method 400 may be performed according to the steps as shown or alternatively configured as determined by a person of ordinary skill in the art to achieve similar functionalities.

Figure 5:
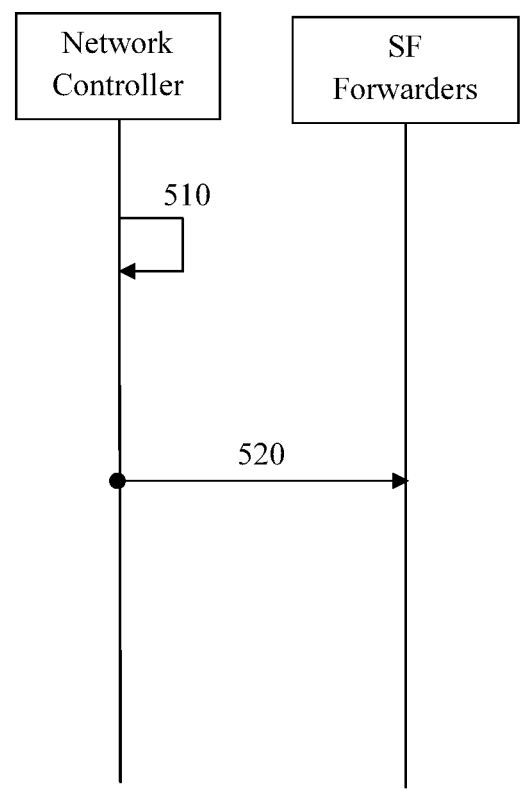
FIG. 5 is a protocol diagram of an embodiment of a service chain path establishment method.

FIG. 5 is a protocol diagram of an embodiment of a service chain path establishment method 500. The method 500 is implemented between a network controller, such as the network controller 120, and one or more SF forwarders, such as the SF forwarders 132. The method 500 is implemented after the network controller constructs a service chain topology map, for example, by employing the methods 300 or 400. As described above, the service chain topology map comprises mappings between SIs (e.g., SIs 150) and corresponding attached SF forwarders. For example, a service chain orchestrator, such as the service chain orchestrator 110, may forward a service request to the network controller, where the service request may specify a sequence of network services for a data flow, where the SIs are instances of the network services. At step 510, the network controller selects a subset of the SIs and corresponding attached SF forwarders to form a service chain path for routing the data flow. As an example, a data flow requires an FW service followed by a NAT service and a network comprises multiple FW SIs and multiple NAT SIs instantiated at several locations in a network, such as the network 130, where the FW and NAT SIs are hosted by several SI hosting devices (e.g., SI hosting devices 131) coupled to several SF forwarders. The network controller may select a particular FW SI and a particular NAT SI and corresponding SF forwarders, for example, by computing a shortest path through the network between a source and a destination of the data flow. The selected FW SI may be hosted by a first SI hosting device coupled to a first SF forwarder in the network and the selected NAT SI may be hosted by a second SI hosting device coupled to a second SF forwarder in the network. The first SI hosting device and the second SI hosting device may be the same SI hosting device or different SI hosting devices. The first SF forwarder and the second SF forwarder may be the same SF forwarder or different SF forwarders. After determining a service chain path, the network controller determines traffic steering rules for the service chain path. Traffic steering rules may include matching conditions, which may be packet-based (e.g., packet header fields) or context-based (e.g., event, time, and/or geolocations), actions, and/or function profiles (e.g., signature file, anti-virus file, and/or Uniform Resource Locator (URL) filtering). At step 520, the network controller pushes the traffic steering rules to the corresponding SF forwarders along the service chain path.

Figure 6:
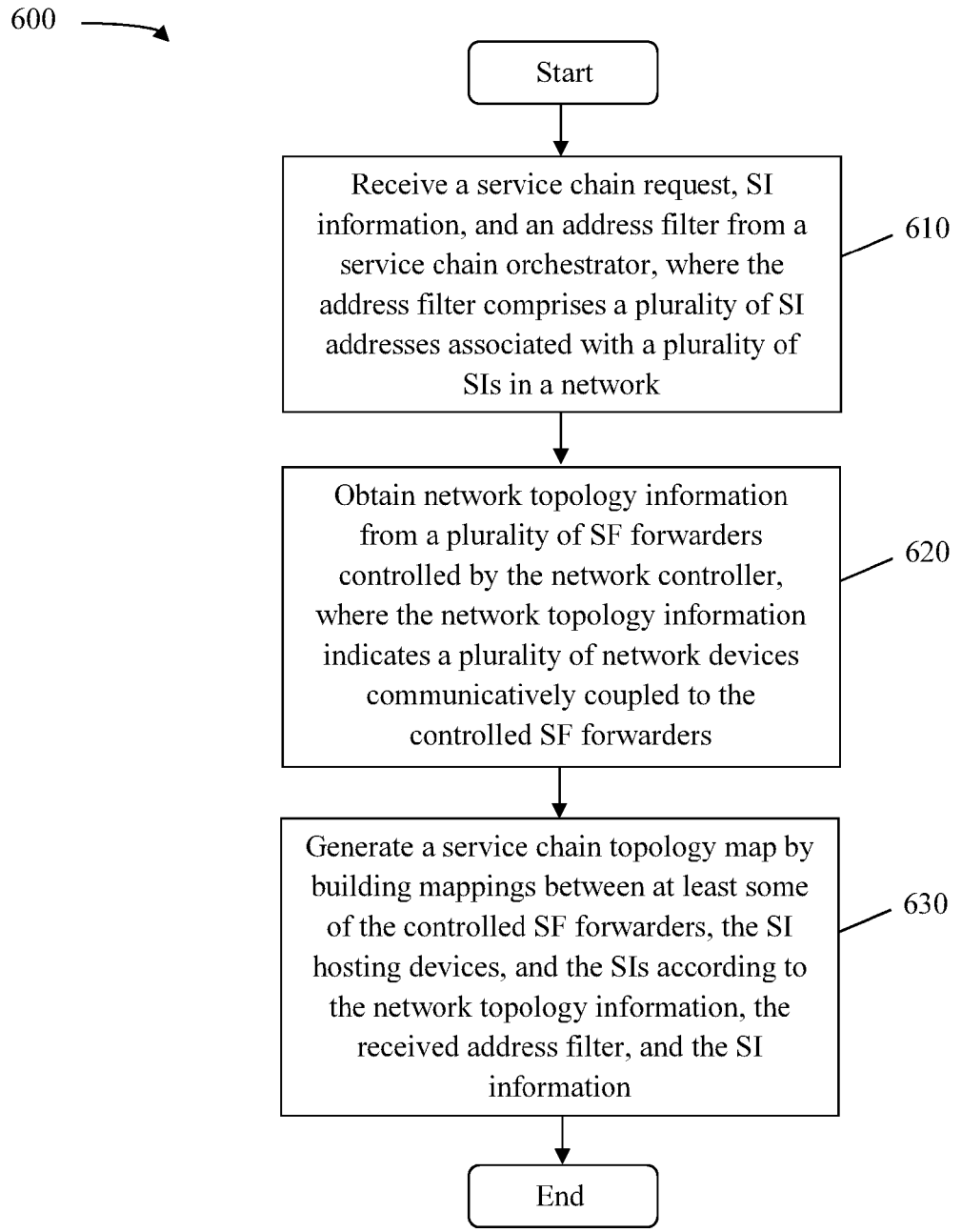
FIG. 6 is a flowchart of an embodiment of a service chain topology map and service chain path generation method.

FIG. 6 is a flowchart of an embodiment of a service chain topology map and service chain path generation method 600. The method 600 is implemented by a network controller, such as the network controller 120, in a service chain network system, such as the system 100. The method 600 employs similar mechanisms as described in the methods 300, 400, and 500. The method 600 begins at step 610 when a service chain request, SI information, and an address filter are received, for example, from a service chain orchestrator, such as the service chain orchestrator 110. The service chain request is originated from a client, such as the client 170, indicating requirements of network services. For example, the service chain request may specify an FW followed by a NAT. The address filter comprises a plurality of SI addresses associated with a plurality of SIs in the network. The SI information indicates SI types, states, attributes, and/or SI hosting devices that host the SIs. It should be noted that the SI addresses may be IP addresses or MAC addresses depending on the protocol layer (e.g., Open System Interconnection (OSI) layer) at which routing is performed. For example, IP addresses may be employed for layer 3 (L3) routing and MAC addresses may be employed for layer 2 (L2) routing.

At step 620, network topology information is obtained from a plurality of SF forwarders, such as the SF forwarders 132, controlled by the network controller. The network topology information indicates a plurality of network devices communicatively coupled (e.g., physically or logically attached) to the SF forwarders, where at least some of the network devices are SI hosting devices. In one embodiment, the network controller may receive connection information from all the SF forwarders, where each SF forwarder provide IF addresses of all its connections, which may include devices that are SI hosting devices and/or devices that are not associated with any SIs. In another embodiment, the network controller may distribute the address filter to the SF forwarders to request the SF forwarders to provide connection information that meets filtering rules of the address filter. In such an embodiment, the network controller receives connection maps from the SF forwarders that are communicatively coupled to network devices that are SI hosting devices associated with the SI addresses received in the addressed filter.

At step 630, a service chain topology map is generated by building mappings between the SF forwarders, the SI hosting devices, and the SIs according to the network topology information and the SI information, and the received address filter.

Figure 7:
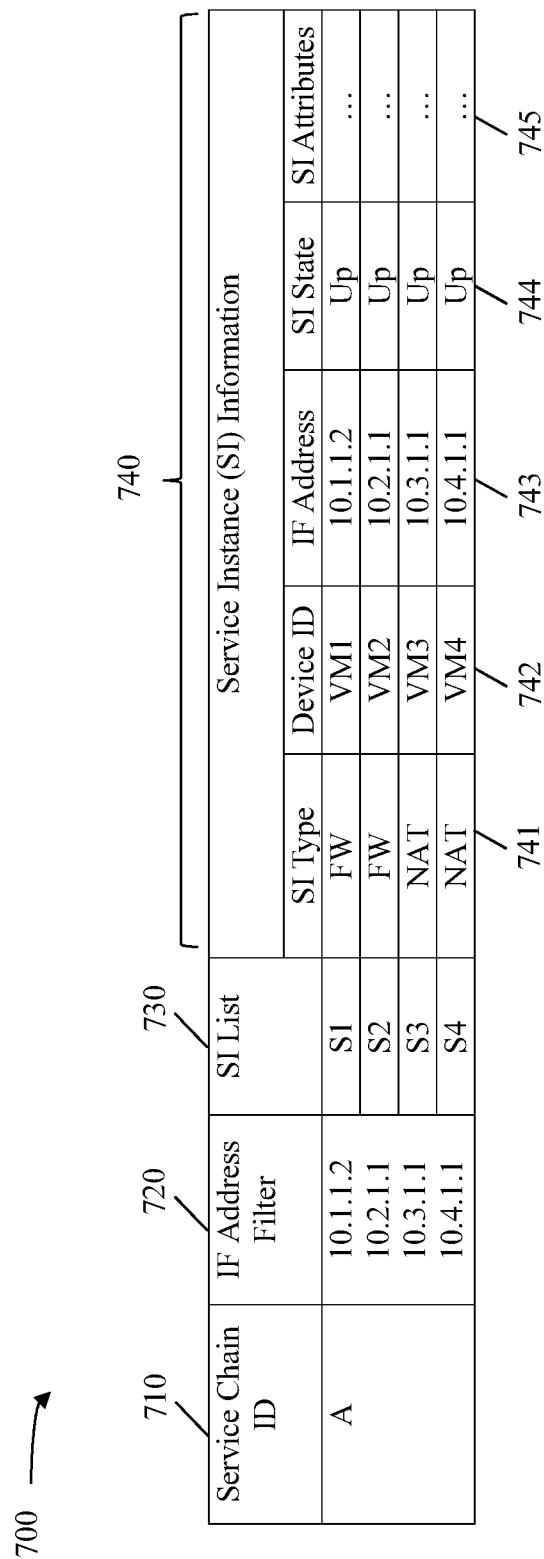
FIG. 7 is a schematic diagram of an embodiment of a SI information map.

FIG. 7 is a schematic diagram of an embodiment of a SI information map 700. The map 700 is employed by a service chain orchestrator, such as the service chain orchestrator 110. For example, the map 700 may be constructed after the service chain orchestrator received a service request for a service chain comprising sequence of network services and obtained a list of SIs (e.g., SIs 150) of the network services available in a network, such as the network 130. The service chain orchestrator may obtain a list of available SIs from a SI manager, such as the SI manager 141, by employing the methods 300, 400, and 600. The map 700 comprises a service chain ID 710, an IF address filter 720, a SI list 730, and SI information 740. The service chain ID 710 identifies the service chain, denoted as A. The SI list 730 identifies SIs that may be employed for composing the service chain A.

For example, the service chain A is formed from an FW SI followed by a NAT SI. The SI list 730 lists all FW SIs and NAT SIs in the network. Each SI in the network is associated with a set of SI information 740. The SI information 740 comprises SI types 741, device IDs 742, IF addresses 743, SI states 744, and SI attributes 745. The SI type 741 identifies a network service type for a SI. The device ID 742 and the IF address 743 identify a device, such as the SI hosting device 131, that hosts the SI. For example, the device ID 742 may comprise a VM ID that identifies a particular VM that provides the SI and the IF address 743 may comprise an IP address of the device. The IF address filter 720 may comprise IF addresses of the devices obtained from the SI information. For example, the IF address filter 720 may correspond to the IF address filter constructed by the service chain orchestrator at steps 330 and 430. The SI state 744 indicates an activity state (e.g., initialization, ready, or up) of the SI. The SI attributes 745 indicates attributes of the SI.

In an embodiment, the SI attributes 745 are associated with flow based security functions. For example, flow based security functions may be categorized by subject, object, action, and function profiles as described in the IETF draft document draft-merged-i2nsf-framework-00.txt, which is incorporated herein by reference. Subject may refer to match values based on packet header fields and/or packet payload. Object may refer to match values based on context, such as time, event, and geolocations. Action may be associated with egress processing, such as invoke signaling, packet forwarding and/or transformation, and/or SDN/NFV integration operations. Functional profiles may be associated with Intrusion Prevention System (IPS) operations. For example, IPS profiles may include a signature file, an anti-virus file, a URL filtering file, etc. for use in detecting intrusive activities. The SI attributes 745 may be vendor-specific. In an embodiment, the SI attributes 745 may be described according to vendor-specific syntaxes. In another embodiment, the SI attributes 745 may be in a uniform format, but still enabling the vendors to include customized attributes for differentiation.

Figure 8:
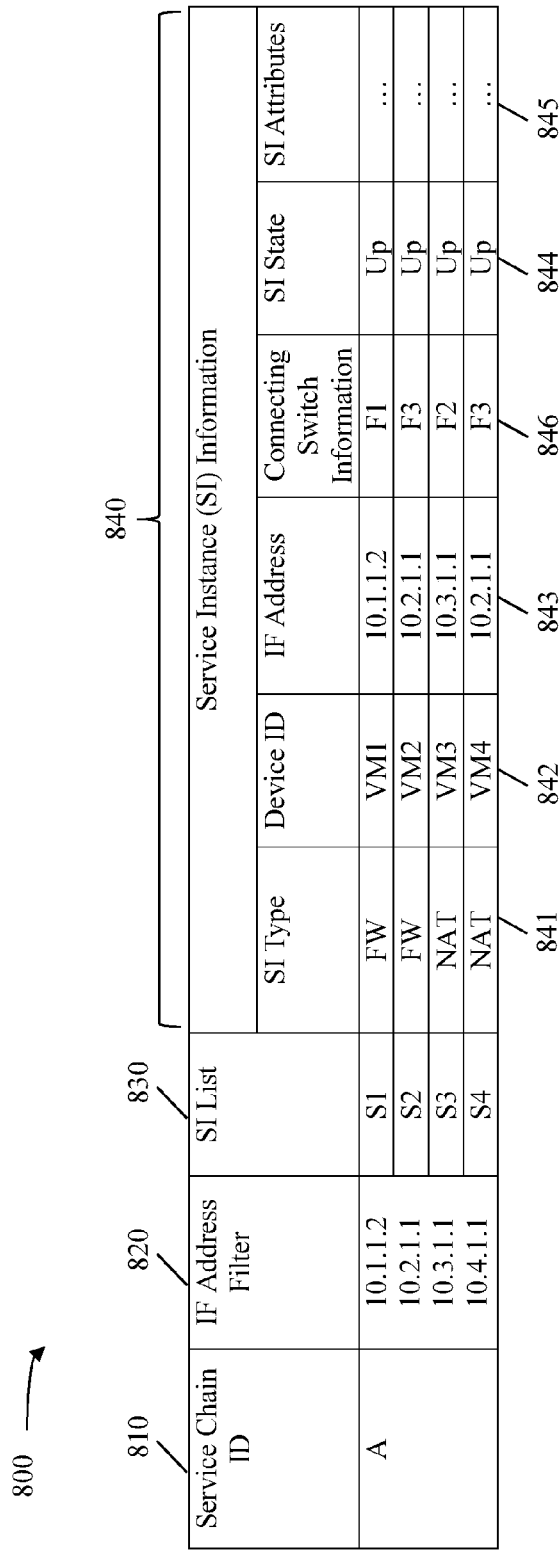
FIG. 8 is a schematic diagram of an embodiment of a service chain topology map comprising connecting switch information.

FIG. 8 is a schematic diagram of an embodiment of a service chain topology map 800 comprising connecting switch information 846. The map 800 is constructed by a network controller, such as the network controller 120, after receiving SI information, such as the SI information 740, and an IF address filter, such as the IF address filter 720, from a service chain orchestrator, such as the service chain orchestrator 110. For example, the map 800 may be constructed after the network controller obtains connection information from a plurality of SF forwarders, such as the SF forwarders 132, for example, by employing the methods 300, 400, and 600. The network controller builds mappings between SIs (e.g., SIs 150) and SI hosting device (e.g., SI hosting devices 131) addresses. The map 800 comprises a service chain ID 810, an IF address filter 820, a SI list 830, and SI information 840. The service chain ID 810, the IF address filter 820, and the SI list 830 are similar to the service chain ID 710, the IF address filter 720, and the SI list 730, respectively. The SI information 840 comprises SI types 841, device IDs 842, IF addresses 843, SI states 844, SI attributes 845, and the connecting switch information 846. The SI types 841, the device IDs 842, the IF addresses 843, the SI states 844, and the attributes 845 are similar to the SI types 741, the device IDs 742, the IF addresses 743, the SI states 744, and the attributes 745, respectively. The connecting switch information 846 identify SF forwarders that are communicatively coupled to the SI hosting devices identified by the IF addresses 843.

Figure 9:
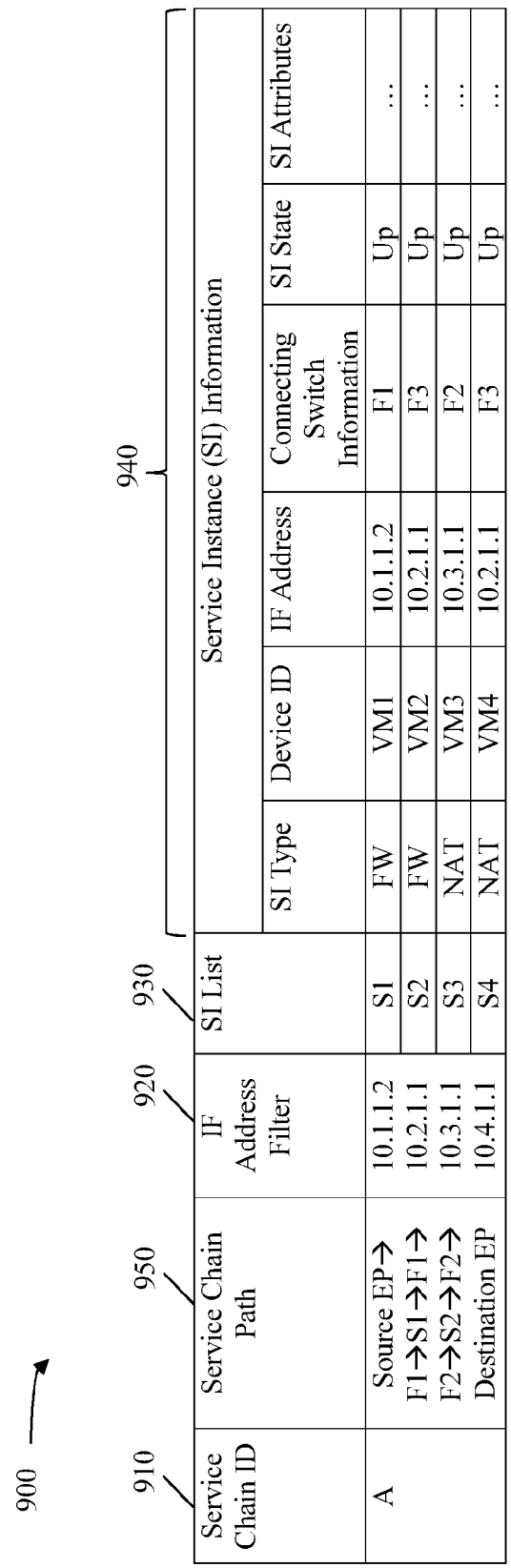
FIG. 9 is a schematic diagram of an embodiment of a service chain topology map comprising service chain path information.

FIG. 9 is a schematic diagram of an embodiment of a service chain topology map 900 comprising service chain path information 950. The map 900 is constructed by a network controller, such as the network controller 120. For example, the map 900 may be constructed after the network controller constructed a map, such as the map 800, for a service chain and determined a service chain path for the service chain. For example, the service chain may be formed from an FW followed by a NAT. The map 900 comprises a service chain ID 910, service chain path information 950, an IF address filter 920, a SI list 930, and SI information 940. The service chain ID 910 is similar to the service chain IDs 710 and 810. The IF address filter 920 is similar to the IF address filters 720 and 820. The SI list 930 is similar to the SI lists 730 and 830. The SI information 940 is similar to the SI information 740 and 840. The service chain path information 950 identifies a service chain path for the service chain. As shown, the network controller selects FW SI S1 attached to SFF1 and NAT SI S3 attached to SFF2, for example, by consulting with PCE to compute a shortest path.

Figure 10:
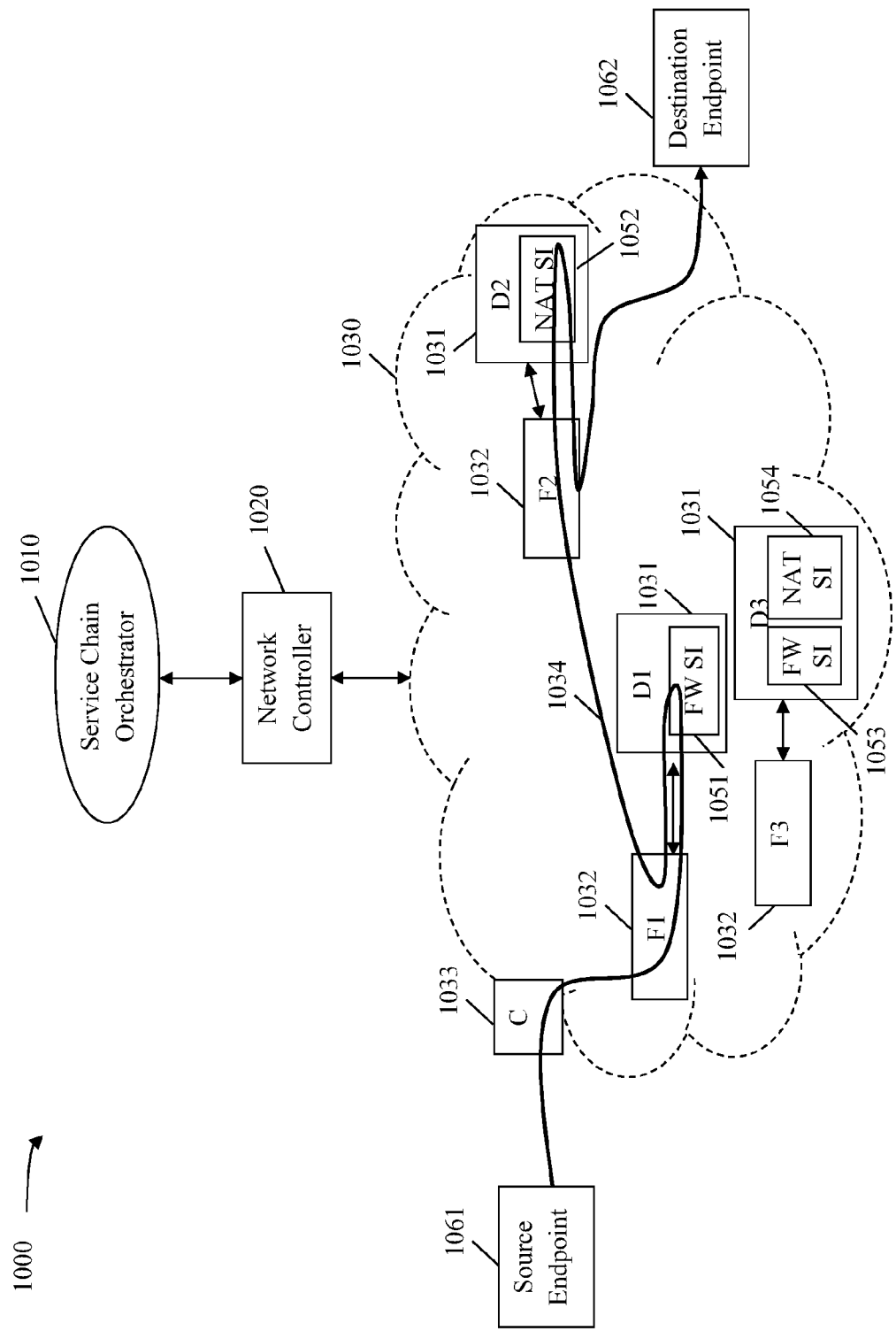
FIG. 10 illustrates an embodiment of a service chain path establishment scenario.

FIG. 10 illustrates an embodiment of a service chain path establishment scenario 1000 in a service chain network system, such as the system 100. In the scenario 1000, a service chain orchestrator 1010 similar to the service chain orchestrator 110 is communicatively coupled to a network controller 1020 similar to the network controller 120. The network controller 1020 is communicatively coupled to a network 1030 similar to the network 130. The network 1030 comprises a classifier 1033 (e.g., C), a plurality of SI hosting devices 1031 (e.g., D1, D2, and D3), and a plurality of SF forwarders 1032 (e.g., F1, F2, and F3). The classifier 1033, the SI hosting devices 1031, and the SF forwarders 1032 are similar to the classifier 133, the SI hosting devices 131, and the SF forwarders 132, respectively. The SF forwarder F1 1032 is communicatively coupled to the SI hosting device D1 1031 and hosts an FW SI 1051. The SF forwarder F2 1032 is communicatively coupled to the SI hosting device D2 1031 and hosts a NAT SI 1052. The SF forwarder F3 1032 is communicatively coupled to the SI hosting device D3 1031 and hosts an FW SI 1053 and a NAT SI 1054. The FW SIs 1051 and 1053 and the NAT SIs 1052 and 1054 are similar to the SIs 150. The scenario 1000 corresponds to a scenario after the service chain orchestrator 1010 constructs a SI information map, such as the map 700, and after the network controller 1020 constructs a service chain topology map, such as the service chain topology maps 800 and 900, for routing a data flow from a source endpoint 1061 to a destination endpoint 1062. The source endpoint 1061 is any device configured to generate data for the data flow and the destination endpoint 1062 is any device configured to receive data from the data flow. For example, the data flow requires an FW service followed by a NAT service. The source endpoint 1061 is connected to the network 1030 via the classifier 1033, which is an ingress node for the data flow.

The service chain orchestrator 1010 may construct a SI information map by querying a SI management entity, such as the SI management entity 140, for availability of FW and NAT services in the network 1030. The network controller 1020 may construct a service chain topology map to locate the SF forwarders 1032 that are communicatively coupled to the SI hosting devices 1031 hosting the FW and NAT services by employing the methods 300, 400, and/or 600. The service chain topology map may be similar to the service chain topology map 900.

After constructing the service chain topology map, the network controller 1020 generates a service chain path 1034 by selecting a subset of the FW SIs 1051 and 1053 and the NAT SIs 1052 and 1054. As shown, the network controller 1020 selected a service chain path 1034 that traverses through the FW SI 1051 hosted by the SI hosting device D1 1031 via the SF forwarder F1 1032, followed by the NAT SI 1052 hosted by the SI hosting device D2 1031 via the SF forwarder F2 1032. The network controller 1020 may coordinate with a PCE to determine that the service chain path 1034 is a shortest path traversing the sequence of services (e.g., an FW followed by a NAT) required by the data flow.

After selecting the service chain path 1034, the network controller 1020 generates traffic steering rules for routing the data flow along the service chain path 1034 and sends the traffic steering rules to the SF forwarders F1 and F2 1032. The interactions between the service chain orchestrator 1010, the network controller 1020, and the SF forwarders F1 and F2 1032 may be similar to the mechanisms described in the methods 300, 400, and/or 500.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. A method implemented by a network controller, comprising:
   receiving an address filter from a service chain orchestrator, wherein the address filter comprises a plurality of service instance (SI) addresses associated with a plurality of SIs in a network;
   obtaining network topology information from a plurality of service function (SF) forwarders controlled by the network controller, wherein the network topology information indicates a plurality of network devices communicatively coupled to the plurality of controlled SF forwarders, and wherein at least some of the network devices are SI hosting devices;
   generating a service chain topology map by building mappings between at least some of the plurality of controlled SF forwarders, the SI hosting devices, and the plurality of SIs according to the network topology information and the address filter;
   receiving a service chain request from the service chain orchestrator indicating a sequence of network services; and
   determining a service chain path according to the service chain topology map and the sequence of network services received in the service chain request;
   wherein the sequence of network services is associated with a traffic flow in the network; and
   wherein the service chain path traverses a sequence of the plurality of controlled SF forwarders and corresponding SI hosting devices that are communicatively coupled to the sequence of the plurality of controlled SF forwarders.

2. The method of claim 1, wherein obtaining the network topology information comprises:
   receiving connection information from the plurality of controlled SF forwarders indicating network devices that are communicatively coupled to the controlled SF forwarders, wherein the connection information comprises a plurality' of network device addresses identifying the communicatively coupled network devices, and
   wherein generating the service chain topology map comprises applying the received address filter to the received connection information to select SF forwarders that are communicatively coupled to network devices that are SI hosting devices associated with the plurality of SI addresses received in the address filter.

3. The method of claim 1, wherein obtaining the network topology information comprises:
   distributing the address filter to the plurality of controlled SF forwarders to request the plurality of controlled SF forwarders to provide only connection information that matches the address filter; and
   receiving the connection information from at least some of the plurality of controlled SF forwarders that are communicatively coupled to network devices that are SI hosting devices associated with the SI addresses received in the address filter.

4. The method of claim 1, further comprising:
   determining a traffic steering rule according to the selected service chain path; and
   pushing the traffic steering rule to the sequence of the plurality of controlled SF forwarders in the service chain path.

5. The method of claim 1, further comprising receiving SI information associated with the plurality of SIs from the service chain orchestrator, wherein the SI information comprises network service types of the plurality of SIs, states of the plurality of SIs, and attributes of the plurality of SIs, and wherein the service chain topology map is further built according to the received SI information.

6. The method of claim 1, wherein the network topology info oration indicates that one of the controlled SF forwarders is communicatively coupled to at least two SI hosting devices.

7. The method of claim 1, wherein the SI hosting devices comprise virtual machines (VMs), physical appliances, or combinations thereof.

8. A software-defined networking (SDN) controller comprising:
   a receiver configured to receive an address filter from a service chain orchestrator, wherein the address filter comprises a plurality of service instance (SI) addresses associated with a plurality of SIs in a network; and
   a processor coupled to the receiver and configured to:
      obtain network topology information identifying a plurality of service function (SF) forwarders controlled by the SDN controller, wherein the network topology information indicates a plurality of network devices that are communicatively coupled to the plurality of controlled SF forwarders, and wherein at least some of the plurality of communicatively coupled network devices are SI hosting devices;

generate a service chain topology map by building mappings between the plurality of controlled SF forwarders, the SI hosting devices, and the plurality of SIs according to the network topology information and the address filter;

receive a service chain request from the service chain orchestrator indicating a sequence of network services;

determine a service chain path according to the service chain topology map and the sequence of network services received in the service chain request;

wherein the sequence of network services is associated with a traffic flow in the network; and wherein the service chain path traverses a sequence of the plurality of controlled SF forwarders and corresponding SI hosting devices that are communicatively coupled to the sequence of the plurality of controlled SF forwarders.

9. The SDN controller of claim 8, wherein the receiver is further configured to receive connection information from the plurality of controlled SF forwarders indicating network devices that are communicatively coupled to the plurality of controlled SF forwarders, wherein the connection information comprises a plurality of network device addresses identifying the plurality of communicatively coupled network devices, and wherein the processor is further configured to generate the service chain topology map by applying the received address filter to the received connection information to select SF forwarders that are communicatively coupled to network devices that are SI hosting devices associated with the plurality of SI addresses.

10. The SDN controller of claim 8, further comprising a transmitter coupled to the processor and configured to distribute the address filter to the plurality of controlled SF forwarders, wherein the receiver is further configured to receive connection maps from at least some of the plurality of controlled SF forwarders that are communicatively coupled to network devices that are SI hosting devices associated with the SI addresses received in the address filter, and wherein the network topology information is obtained from the connection maps.

11. The SDN controller of claim 9, wherein the processor is further configured to determine a traffic steering rule according to the selected service chain path, and wherein the SDN controller further comprises a transmitter coupled to the processor and configured to send the traffic steering rule to the sequence of the plurality of controlled SF forwarders in the service chain path.

12. The SDN controller of claim 8, wherein the plurality of SI addresses comprise Internet protocol (IP) addresses, media access control (MAC) addresses, or combinations thereof.

\* \* \* \* \*

UNITED STATES PATENT AND TRADEMARK OFFICE
CERTIFICATE OF CORRECTION

PATENT NO. : 9,722,927 B2
APPLICATION NO. : 14/732268
DATED : August 1, 2017
INVENTOR(S) : Hong Zhang et al.

It is certified that error appears in the above-identified patent and that said Letters Patent is hereby corrected as shown below:

In the Claims

Column 16, Lines 11-25, Claim 2, should read:
2. The method of claim 1, wherein obtaining the network topology information comprises:
    receiving connection information from the plurality of controlled SF forwarders indicating network devices that are communicatively coupled to the controlled SF forwarders, wherein the connection information comprises a plurality of network device addresses identifying the communicatively coupled network devices, and
    wherein generating the service chain topology map comprises applying the received address filter to the received connection information to select SF forwarders that are communicatively coupled to network devices that are SI hosting devices associated with the plurality of SI addresses received in the address filter.

Column 16, Lines 50-53, Claim 6, should read:
6. The method of claim 1, wherein the network topology information indicates that one of the controlled SF forwarders is communicatively coupled to at least two SI hosting devices.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*